Feb. 19, 1935.  A. P. BALL  1,991,484
TRUCK BODY CONSTRUCTION
Filed Oct. 6, 1930    5 Sheets-Sheet 2

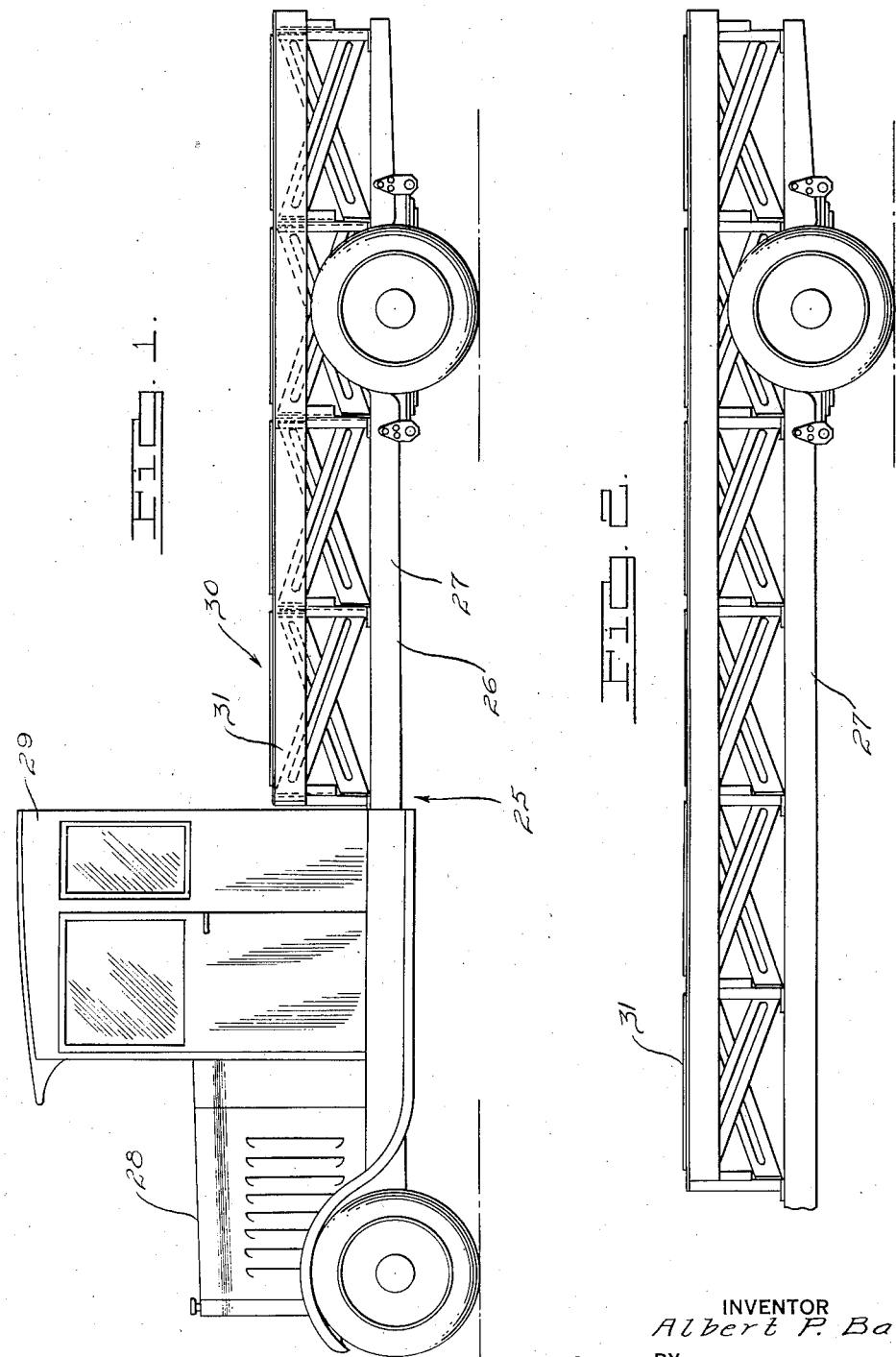

INVENTOR
Albert P. Ball
BY
ATTORNEYS.

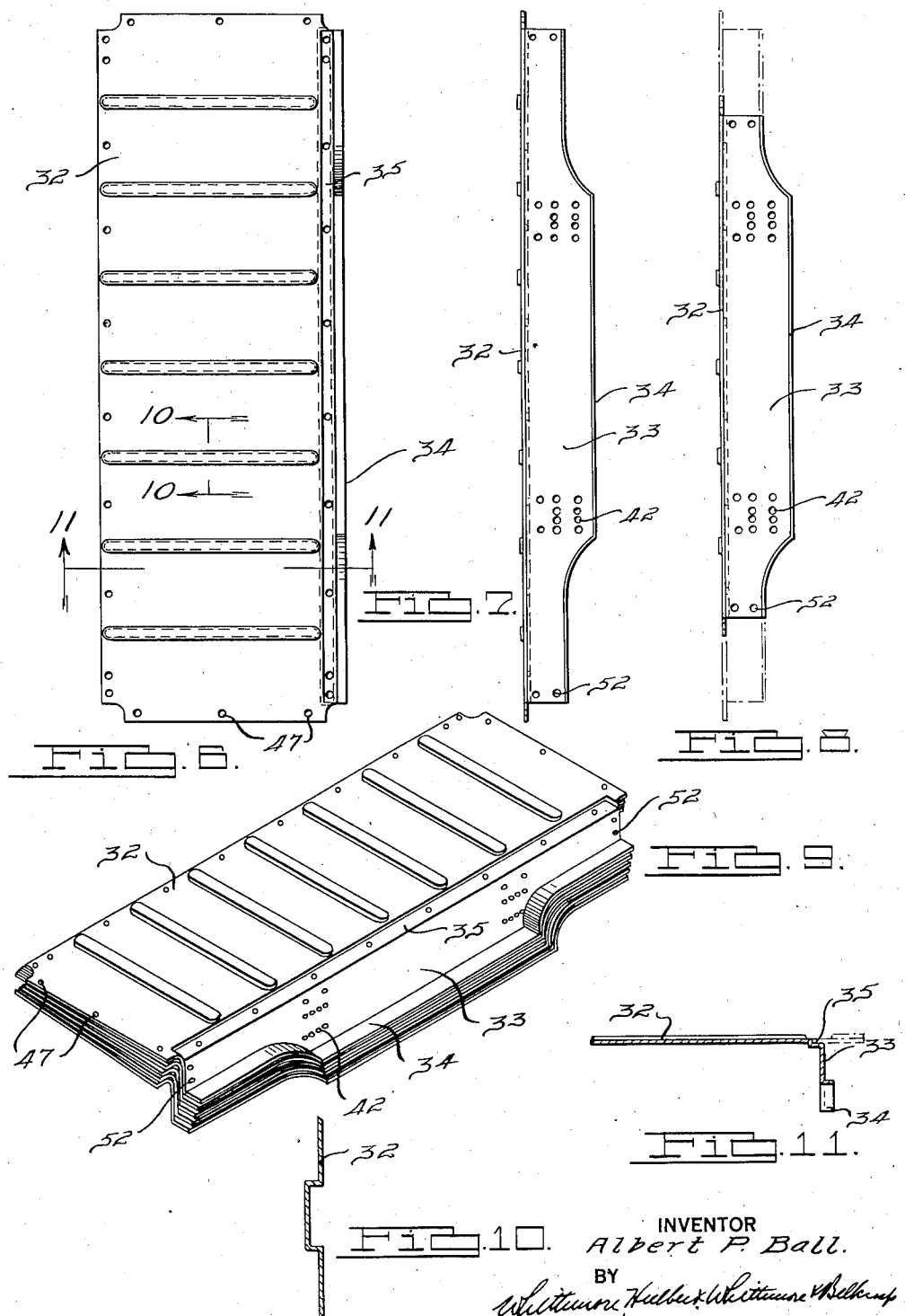

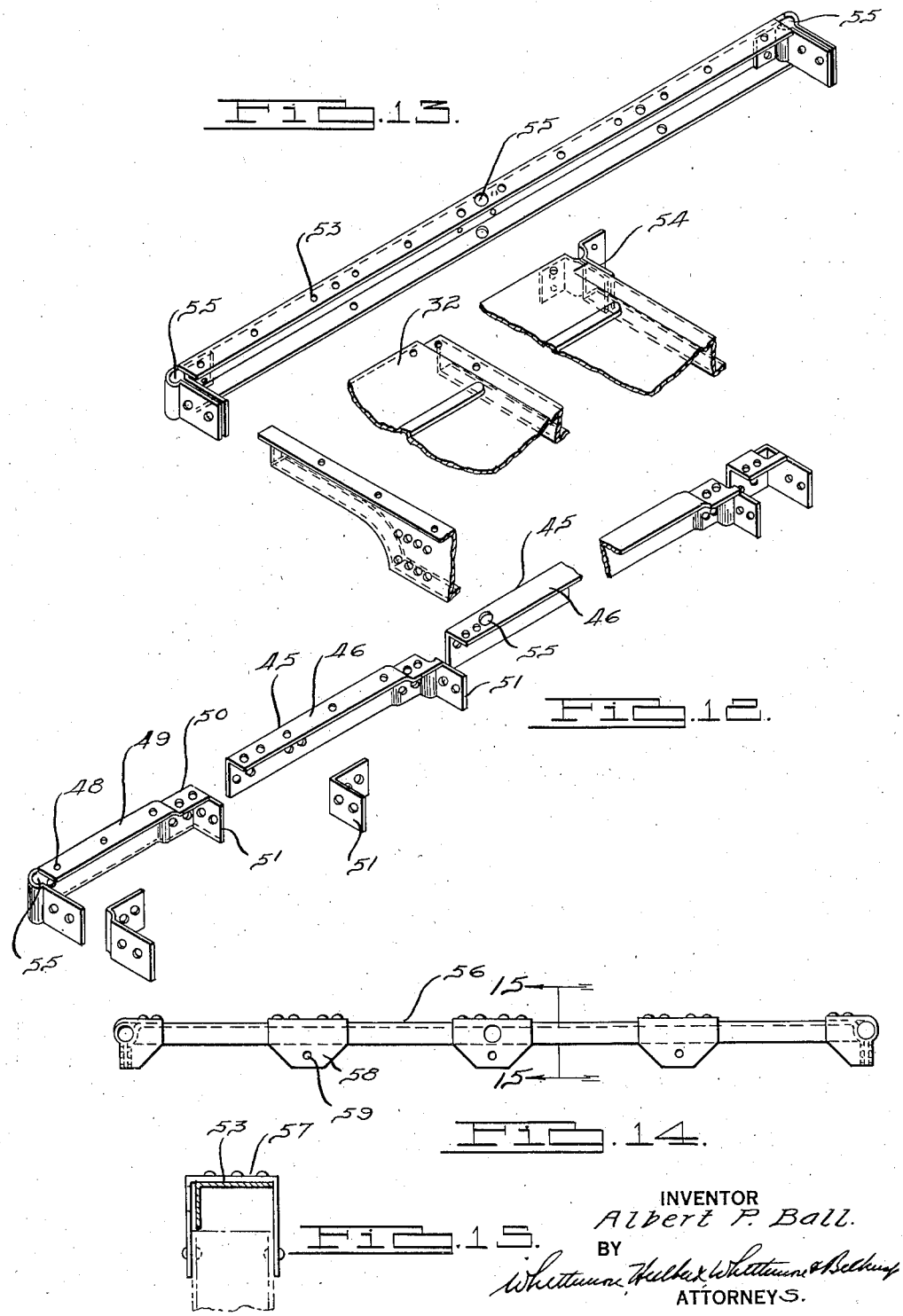

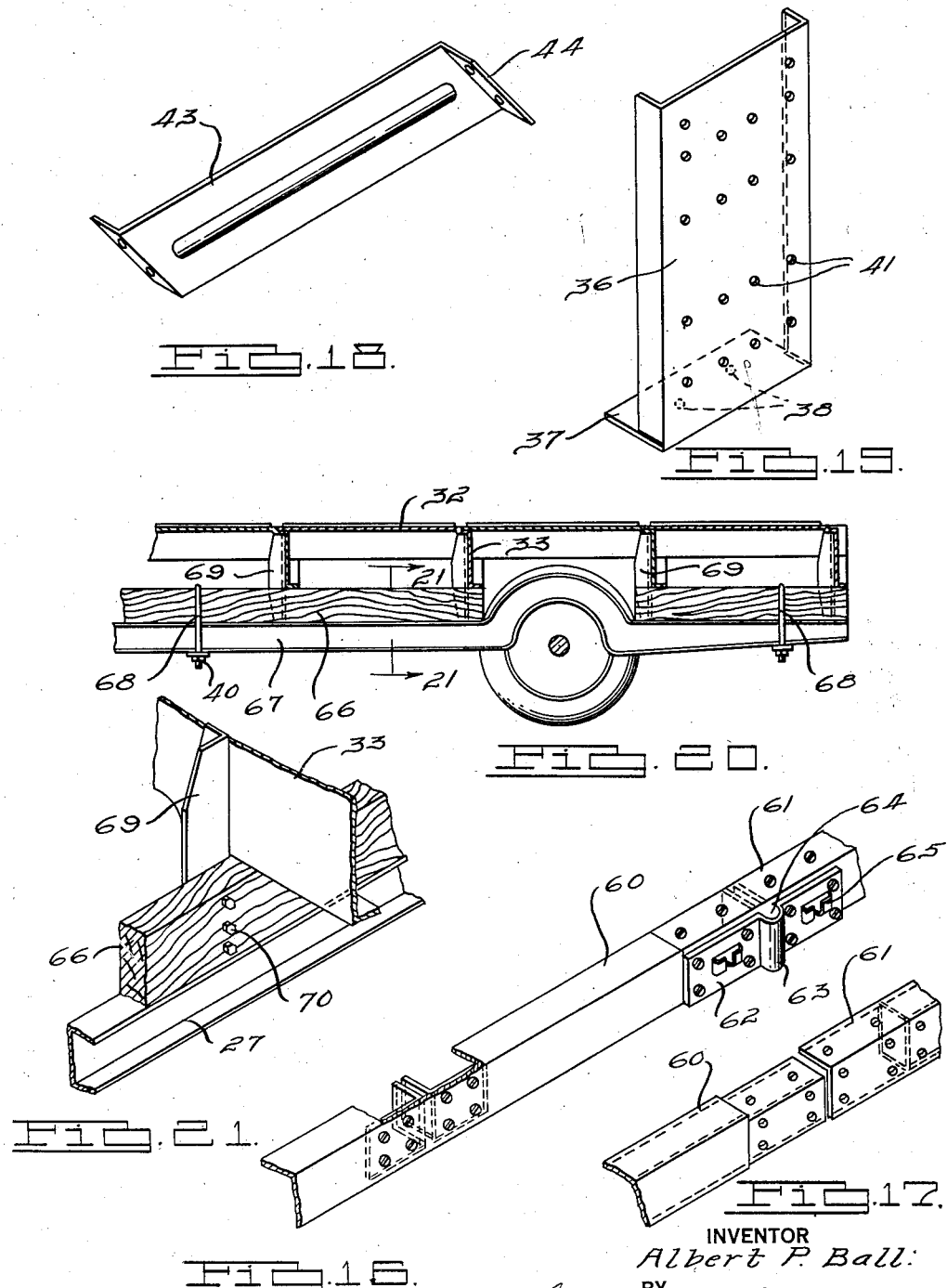

Patented Feb. 19, 1935

1,991,484

UNITED STATES PATENT OFFICE 1,991,484

TRUCK BODY CONSTRUCTION

Albert P. Ball, Detroit, Mich., assignor to Briggs Manufacturing Company, Detroit, Mich., a corporation of Michigan Application October 6, 1930, Serial No. 486,824

9 Claims. (Cl. 296—28)

This invention relates to improvements in the construction of truck bodies and contemplates the provision of a fabricated truck platform built up of a relatively few prefashioned parts capable of being readily assembled in the field upon the truck chassis.

Another object of this invention is to provide a sectional body of the foregoing type wherein the body sections may be assembled on chassis of varying dimensions to form a body therefor by either omitting or adding sections depending upon the chassis dimension.

A further object of this invention is to provide a knocked-down body construction formed of a relatively few small sections capable of being readily detachably mounted upon a chassis and composed of parts so designed as to be capable of being nested prior to assembly rendering it possible to ship or store a comparatively large number of the parts in a relatively small space.

A still further object of the present invention is to provide a body formed of a plurality of independent units designed to be interchangeable and wherein the several parts cooperating to form the units are also interchangeable, thereby materially simplifying manufacture and facilitating assembly.

With the foregoing as well as other objects in view, the invention resides in the particular construction illustrated and about to be described.

In the drawings:

Figure 1 is a side elevational view of a truck equipped with a body constructed in accordance with this invention;

Figure 2 is a fragmentary view similar to Figure 1 illustrating a relatively simple manner in which the body may be extended for use upon a relatively long chassis construction;

Figure 6 is a fragmentary plan view of one of the body sections;

Figure 7 is a side elevational view of the construction shown in Figure 6;

Figure 8 is a view similar to Figure 7 showing a relatively simple manner in which the width of the section may be varied;

Figure 9 is a perspective view illustrating the manner in which the sections may be nested for shipping or storage purposes;

Figure 10 is a sectional view taken on the line 10—10 of Figure 6;

Figure 11 is a sectional view taken on the line 11—11 of Figure 6;

Figure 12 is a perspective view of another of the body sections illustrating the manner in which the sections shown in Figure 6 may be assembled thereto;

Figure 13 is a view similar to Figure 12 showing a slightly modified form of section;

Figure 14 is a top plan view of another modified form of body section;

Figure 15 is a cross sectional view taken on the line 15—15 of Figure 14;

Figure 16 is a view similar to Figure 12 showing still another modified form of body section;

Figure 17 is a fragmentary perspective view illustrating the manner in which several sections of the type shown in Figure 16 are assembled;

Figure 18 is a detail perspective view of another body section;

Figure 19 is a view similar to Figure 18 showing still another of the body sections;

Figure 20 is a view similar to Figure 4 showing a slightly modified form of body construction; and Figure 21 is a fragmentary perspective view of a part of the construction shown in Figure 20.

Figure 3:
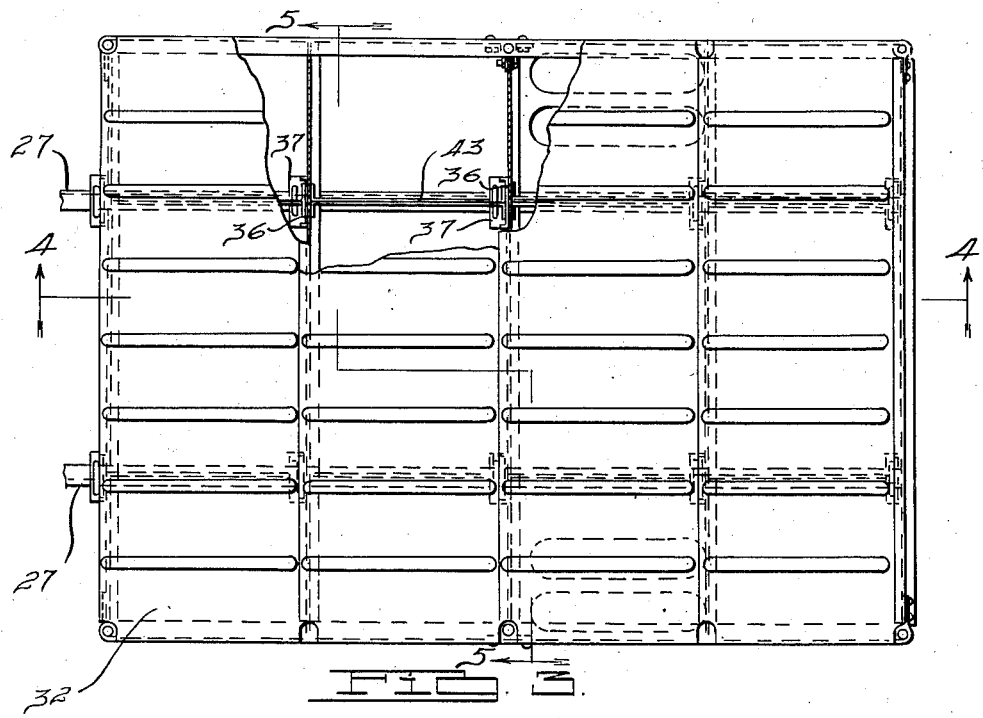
Figure 3 is a fragmentary plan view of the body illustrated in Figure 1.

Referring now to the drawings, it will be noted that there is illustrated in Figure 1 a truck 25 having a chassis 26 of conventional design and comprising a frame 27 of the usual construction. Carried by the frame 27 adjacent the forward end thereof is a motor compartment 28 and a driver's compartment 29 in rear of the motor compartment.

As previously indicated, the present invention concerns itself more particularly with the body or platform construction 30 of the truck which is preferably supported upon the frame 27 in rear of the driver's compartment 29. In general, the platform 30 comprises a plurality of prefashioned units 31 detachably mounted upon the frame 27 and identical in construction so as to permit not only interchanging the same, but also the various parts forming the units. By reason of this construction, the cost of manufacture is not only materially reduced owing to the relatively few number of dies required to form the sections or units, but assemblying of the units upon the chassis is simplified and expedited. Moreover, with the above construction the same units may be utilized for constructing platforms of various dimensions by either eliminating or adding units, whichever is found necessary to produce the desired length of platform. In other words, with the present invention if it is desired to assemble a platform upon a relatively long chassis frame as shown in Figure 2, it is only necessary to increase the number of units or sections 31 and this may be accomplished without altering the construction of the units. It will further be apparent as this description proceeds that practically any width of body may be assembled upon different widths of chassis frames 27 by merely reducing the width of the floor supporting portions of the units 31. The floor supporting parts of the units 31, as will be hereinafter described, are so designed that the same dies may be used for producing practically any width of floor section.

In detail, each unit 31 comprises a floor section 32 adapted to extend transversely of the chassis frame and having a downwardly extending flange 33 at the rear edge thereof terminating in a laterally extending foot flange 34. The rear marginal edge of each floor section is depressed downwardly forming an L-shaped recess 35 adapted to receive the adjacent edge of the next floor section. The depth of the recess 35 is such that when the adjacent edge of the next section is in assembled relation therewith, the upper surfaces of both sections will lie in a common plane or in other words, will be flush providing, in effect, a one piece floor construction as shown in Figure 11. If desired, the depressed marginal edge of one floor section and the overlapping edge of the next adjacent floor section may have aligned openings therein for receiving bolts or other suitable fastening elements such as rivets or the like. The opposite sides of the floor sections 32 project beyond the side sills an appreciable distance thereby permitting the substitution of floor sections of less width, as shown in Figure 8, without altering or otherwise interfering with the construction of the remaining parts of the units or chassis frame. Moreover, it will be obvious by comparing the illustrations in Figures 7 and 8 that the same dies may be used in fashioning both types of floor sections.

Figure 4:
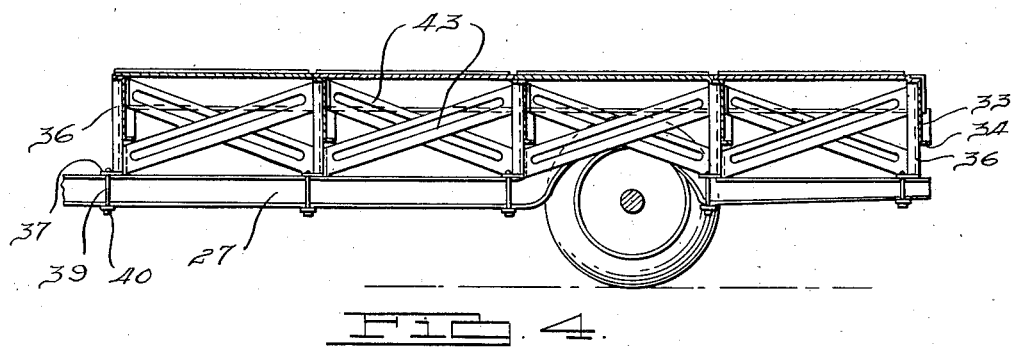
Figure 4 is a sectional view taken on the line 4—4 of Figure 3.
Figure 5:
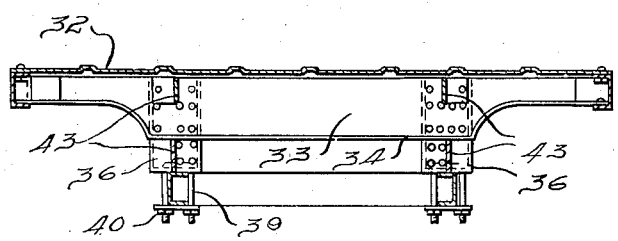
Figure 5 is a sectional view taken substantially on the plane indicated by the line 5—5 of Figure 3.

The floor sections 32 of the units 31 are preferably supported above the chassis frame 27 by means of the upright members 36 which are preferably channel-shaped in cross section, as shown in Figure 19, and are provided with foot flanges 37 adapted to rest upon the side sills of the chassis frame as shown in Figure 4. The foot flanges 37 are preferably provided with laterally spaced openings 38 therein for receiving suitable U-bolts 39 having the leg portions extending downwardly upon opposite sides of the sill members forming the frame 27 and adapted to be clamped thereto by means of the bars 39 engaging the lower edges of the sill members and the nuts 40 threadedly mounted upon the ends of the U-bolts. The construction is such as to permit the upright members and accordingly the units to be readily attached to and detached from the chassis frame. The web portions of the upright members 36 embrace the downwardly extending flanges 33 on the floor sections and are formed with openings 41 therethrough in alignment with similar openings 42 in the flanges 33 for receiving suitable fastener elements. In this connection it is to be noted that the upright members and floor sections may be secured together either by rivets, bolts or by a welding operation in which event the openings in the floor sections and upright members may be eliminated. From the foregoing, it will be seen that each of the floor sections are provided with a pair of upright members for engaging the laterally spaced sills of the chassis frame and in order to provide an efficient construction, tension members or braces 43 are secured to each of the upright members 36. As shown in Figure 4, a pair of braces are arranged upon opposite sides of each unit 31 and extend transversely of each other having the opposite ends terminating in flanges 44, as shown in Figure 18, for attachment to the upright members and floor sections.

The side edges of the floor sections 32 are braced by suitable sill members 45 which may be formed of any desired number of sections of any suitable contour. As shown in Figure 12, however, the sill members are formed of a plurality of angle bars having the horizontal flange 46 uppermost and forming a seat for the side edges of the floor sections. If desired, the side edges of the floor sections may be provided with openings 47 adapted to register with corresponding openings 48 in the sill members 45 for receiving suitable fastening elements. The sill construction shown in Figure 12 is such that each section 49 of the sill is substantially equal in length to the width of the floor sections and one of the ends of each of the sill sections 49 are depressed as at 50 for receiving the adjacent end of the next sill section flush with the top surface thereof. The overlapping ends of the sill sections are preferably provided with aligned openings for receiving suitable fastening elements which are preferably in the form of bolts so as to permit the sill sections to be readily detached from each other. With this arrangement, it will be seen that each individual unit 31 is provided with a sill section capable of being readily attached to the sill sections of other units to provide the desired length of the body. Also with the above construction, the length of the body may be varied by either adding sections or eliminating sections depending upon the length of body desired. If desired, suitable angle brackets 51 may be secured to the vertical flanges of the sill sections 49 in such a manner that when the sections are in assembled relation, the brackets cooperate with each other to embrace opposite sides of the flanges 33 on the floor sections and are provided with openings therethrough cooperating with aligned openings 52 in the floor sections for receiving suitable fastening elements.

In the event it is desired to secure a plurality of the floor sections 32 together as a unit, a sill constructed as illustrated in Figure 13 may be provided. The sill 53, shown in Figure 13, is preferably channel-shaped in cross section and is of such length to accommodate the desired number of floor sections. In the illustrative embodiment of the sill 53, the latter is of sufficient length to receive four floor sections. The floor sections 32, in Figure 13, may be secured to the sill member 53 in any suitable manner such as by means of the brackets 54 which are similar in construction to the brackets 51 described above. Both of the sill constructions illustrated in Figures 12 and 13 are preferably provided with stake-receiving pockets 55 for detachably receiving the conventional upright members or side wall sections. It is to be noted, however, that any suitable side wall construction may be built up from the units 31 without altering or otherwise interfering therewith.

The sill member 56, illustrated in Figure 14, differs from the sill construction shown in Figure 13 in that suitable inwardly opening U-shaped brackets 57 are extended over the sill 53, as shown in Figure 15, and are provided with extensions 58 projecting inwardly beyond the sill. The brackets 57 are secured to the sill 56 at longitudinally spaced points and serve to secure the floor sections 32 to the sill 56.

The sill construction illustrated in Figures 16 and 17 differs from either of the above-described forms of sill members in that the sections 60 and 61 of the sills are secured in overlapping relation to each other by means of a bracket 62 having a central portion 63 cooperating with the outer sides of the sill members to form a stake-receiving pocket 64 and having hinge parts 65 pressed laterally outwardly from adjacent the ends thereof. The hinge parts 65 are adapted to receive corresponding hinge parts on the side walls of the body which forms the subject matter of my co-pending application, Serial Number 486,826 and as a consequence, are not shown herein.

The modified form of body construction illustrated in Figure 20 differs from the construction specified above in that the cross braces are eliminated from the units 31 and the latter are supported directly upon auxiliary sill members 66 which, in the present instance, are shown as wood beams detachably clamped to the chassis sills 67 by means of the U-bolts 68. With this latter construction the upright members 69 are secured as at 70 to the wood sills 66 and the foot flanges 34 of the floor sections are adapted to seat directly upon the wood sills as clearly shown in Figure 20.

Thus, from the foregoing it will be apparent that I have provided a body construction for trucks comprising a plurality of units capable of being readily assembled upon the truck chassis. It will also be seen that when using a sectional sill assembly of the type shown in Figure 12 for the floor sections, any number of the units may be secured together to accommodate trucks of various lengths. By selecting the desired type of sill member, one unit may either comprise a single floor section or a plurality of floor sections depending upon the length of sill used. It will further be apparent that since the floor sections are designed to extend laterally beyond the truck frame members an appreciable distance, the width of the floor may be varied, as shown in Figure 8, without altering the remaining construction of the units or interfering in any way with the truck frame 27. Moreover, the design of the floor section is such as to permit the same to be nested, as shown in Figure 9, with the result that a number of sections may be stored or shipped in a minimum amount of space.

What I claim as my invention is:

1. A truck body comprising a plurality of prefashioned interchangeable units cooperating with each other to form a load supporting platform, each unit having an edge portion depressed to a depth substantially equal to the thickness of the unit and shaped to receive the overlapping edge of the next adjacent unit to provide a substantially continuous surface.

2. A truck body comprising a plurality of prefashioned interchangeable units cooperating with each other to form a load supporting platform, each unit having a downwardly depending flange at one longitudinal edge, a depressed portion adjacent said flange, and the other lonigtudinal edge lying in a plane with the body of the unit, and overlapping the next adjacent unit and engaging the depressed portion of said next adjacent unit to provide a substantially flat continuous surface.

3. A truck body comprising a plurality of prefashioned units cooperating with each other to form a load supporting platform and built up of a plurality of interchangeable sections, each unit having a downwardly extending flange at one edge thereof terminating in a laterally extending foot flange and provided with a depressed portion adjacent said first mentioned flange and adapted to receive the overlapping edge of the next adjacent unit to provide a substantially flat continuous surface.

4. In a truck body construction, the combination with a truck chassis, of a load supporting platform built up of a plurality of transversely extending prefashioned interchangeable units comprising floor sections, longitudinally extending sectional sill members for said units providing means for securing said units together, upright members secured to said floor sections for supporting the latter spaced from the chassis, and means detachably securing said upright members to the chassis.

5. In a truck body construction, the combination with a truck chassis, of a load supporting platform built up of a plurality of prefashioned units, each unit comprising a floor section and means for supporting the floor section in spaced relation to the chassis, one of the longitudinal edges of the section having a depressed portion and the other of the longitudinal edges being in the plane of the floor section and overlapping the depressed portion of the next adjacent floor section whereby the top surfaces of the floor sections lie flush with each other to provide a substantially flat continuous surface.

6. In a truck body construction, a plurality of interchangeable sections cooperating with each other to form a load supporting platform, a plurality of upright members for supporting said sections in spaced relation to the truck chassis and located at the meeting lines of said sections, and a pair of tension braces arranged diagonally between and secured to said upright members for reinforcing said load supporting platform.

7. In a truck body construction, the combination with the chassis frame thereof, of a load supporting platform comprising a plurality of transversely extending interchangeable sections, each section having a longitudinal edge thereof adapted to overlap an edge of an adjacent section flush with the top surface of the latter, and a plurality of upright supporting members located at the junction of said sections and detachably secured to said chassis frame and sections respectively.

8. In a truck body construction, the combination with the chassis frame thereof, of a load supporting platform comprising a plurality of transversely extending interchangeable sections, each section having a downwardly extending flange at one longitudinal edge thereof, each section having a lonigtuidnal edge thereof adapted to overlap an edge of an adjacent section flush with the top surface of the latter, and upright supporting members secured respectively to the downwardly extending flange of each section and to said chassis frame to support said sections in spaced relation to said chassis frame.

9. In a truck body construction, the combination with a truck chassis frame, of a load supporting platform comprising a plurality of interchangeable units constituting floor sections, a downwardly extending flange on one longitudinal edge of each floor section, and sill members extending along the longitudinal edges of said load supporting platform, said sill members being formed in sections, the adjacent ends of adjacent sections being secured to opposite sides of the downwardly extending flanges of the floor sections.

ALBERT P. BALL.